Dec. 1, 1931.    T. E. PECK    1,834,175
ANIMAL SPRAY
Original Filed May 27, 1929
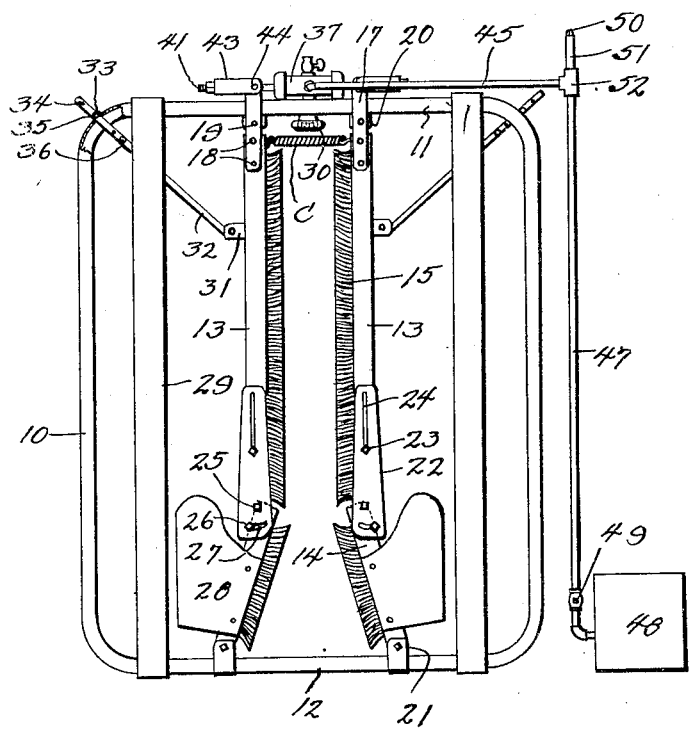
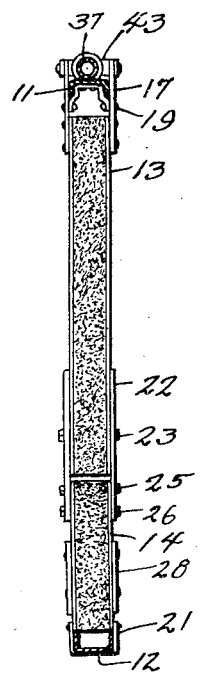
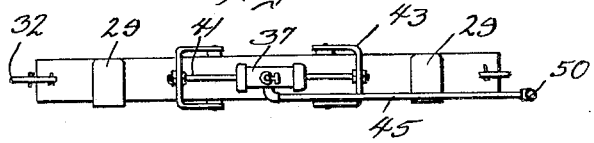
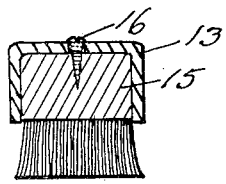
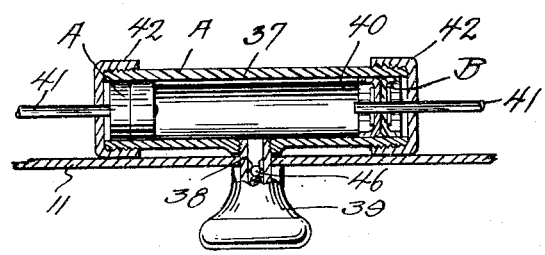
Inventor
Thomas E. Peck
By Lynn H. Latta
Attorney Patented Dec. 1, 1931

1,834,175

UNITED STATES PATENT OFFICE

THOMAS E. PECK, OF SIOUX CITY, IOWA

ANIMAL SPRAY

Application filed May 27, 1929, Serial No. 366,348. Renewed May 11, 1931.

My invention relates to a device for applying disinfectant, oil and the like to animals such as hogs and cattle and has for its primary object to provide a spray that is incorporated in a gateway adapted to be secured in a fencing structure or a gate opening so that animals may be forced to pass through the gateway and to thereby be forced to submit to a disinfecting operation.

More specifically, it is my purpose to provide a device of this kind in which the animal may be forced to pass between vertically disposed gate members adapted to be pushed apart by the body of the animal and provided with means for applying the disinfectant or oil to the body of the animal.

A further object of my invention is to provide a device of this character in which the action of the gate members in being pushed apart serves to actuate a pump device for forcibly spraying downwardly a spray of oil or disinfectant adapted to cover the animal passing through the gate and to be deposited upon the gate members from which it will be transferred to the body of the animal.

Another object of my invention is to provide a device of this character including two sets of gate members, one on either side of the center of the gateway, the connection with the pump mechanism being such that movement of both or either of the gate members away from the center of the gate will serve to operate the pump.

Another object of my invention is to provide a structure of this character in which the gate members are formed each of a pair of arms hinged to the top and bottom of the gateway, respectively, for swinging movement in the plane of the gate and connected by means of an element that allows the adjacent ends of the gate members to pull away from each other.

Another object is to provide a device of this kind including a tank from which the disinfectant or oil is to be drawn from the pump, together with an arrangement by which the pump may pull solution from the tank by suction, means also being provided for priming the pump at any time that it may become unprimed.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of the device with my invention embodied therein.

Fig. 2 is a vertical, central, sectional view through the device.

Fig. 3 is a plan view of the device.

Fig. 4 is a detail, sectional view taken through one of the gate member arms and Fig. 5 is a longitudinal, sectional view through the pump.

I have used the reference character 10 to indicate the side arms of a gateway having the top member 11 and the bottom member 12.

The gateway is formed of a length of channel iron, bent to the shape shown with rounded corners and with the web of the channel on the outside.

The gate members each comprise an upper arm 13 and a lower arm 14, each constructed of channel iron as shown in Fig. 4 and equipped with a brush 15, secured in the channel iron as by means of screws 16.

Each arm 13 is provided with a pair of levers 17, secured to the flanges of the arms as at 18, embracing the top portion 11 of the gateway extending thereabove and pivoted at 19 to a bracket 20 secured to the gateway.

The lower arms 14 are pivoted between the arms of a pair of yoke shaped brackets 21, secured to the bottom of the gateway.

The arms 13 and 14 are connected by a pair of plates 22, which are slidable longitudinally of the arm 13, being connected thereto by bolts 23, extending through slots 24 in the plates 22. The plates 22 are mounted for limited swinging movement relative to the arm 14, being hinged thereto by a bolt 25 and connected by a bolt 26 passing through slots 27 in the respective plates concentric with the bolt 25.

The connection above described allows the lower arms 14 to move outwardly a limited distance without moving the upper arms 13.

This function of the device is important where small pigs are passing through the gate, as it is much easier to move the short arms 14 than to move both arms 13 and 14.

Plates 28 are secured to the arms 14 and close the space between the arms 14 and the bars 29 so that small animals may not slip through the gateway without passing through the arms 14.

The bars 29 cover the spaces between the arms 13 and the sides 10 of the gateway so as to prevent large hogs from sticking their heads between the members 13 and the sides of the gateway and trying to force through. The brushes 15 receive disinfectant or oil from the spray nozzle 30 and carry it to the sides of an animal passing through the gateway. They also serve to work into the hide of the animal, the disinfectant or oil that is sprayed onto the body of the animal.

To each arm 13 is secured a bracket 31, to which is pivoted a rod 32, extending through an opening 33 in the web of the gateway at the upper corner thereof.

A plurality of openings 34 in each rod 32 is adapted to receive nails or pins or the like 35 and 36, by means of which movement of the gate members in either direction may be limited and controlled.

By controlling the movement of the gate members, the length of stroke of the pump, which will hereinafter be described, may be controlled and the amount of disinfectant or oil that is delivered may correspondingly be controlled.

The pump comprises a pump cylinder 37, provided with a short pipe 38, tapped into one side and a nozzle 39, which is secured to the end of the pipe 38.

The pipe 38 passes through an opening in the web of the top 11 of the gate and the nozzle 39 serves to secure the pump in place on the gateway.

The pump is provided with two pistons A and B, each of which has a pair of cup washers 40, positioned in opposition to each other so that each piston may act in both directions of its travel.

A spring C is secured between the gate members 13 and 10 and serves to draw them toward their closed positions shown in Fig. 1.

The piston rods 41 are secured to the pistons; extend through the end caps 42 of the pump cylinder and are secured to yokes 43 (Fig. 3) which connect them to the levers 17.

The yokes 43 are pivoted to the levers 17 at 44.

Oil is taken into the pump cylinder through a pipe 45, which connects to the side of the cylinder midway between its ends. It will now be seen that as either of the gate members 13 is moved outwardly away from the center of the gateway that its levers 17 will push the corresponding piston toward the center of the pump cylinder 37, forcing oil through the nozzle 39 into a spray extending downwardly into the space of the gateway. This will be true whether either gate member is being operated or both together are being operated.

When the gate member returns to its position depending vertically, it will return the piston to a position near the end of the cylinder sucking oil or disinfectant into the cylinder through the pipe 45. The entrance of air through the nozzle 39 is prevented by a check valve 46 in the pipe 38 or in the nozzle 39.

Oil is sucked through the pipe 45 and a vertical pipe 47 from a tank 48. A check valve 49 prevents the return of oil to the tank 48. The tank 48 may be positioned in any convenient location.

Should the pump at any time become drained of oil, the cylinder 37 may be filled with oil by removing the plug 50 from the upper end of a short tube 51, into which it is threaded. Oil is poured into the tube 51 and after filling it, the oil will run through the pipe 45 into the cylinder 37. The pipes 47, 51 and 45 are connected by a T union 52.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In an animal spray, a gateway, two pairs of gate elements hinged to the top and bottom, respectively, of the gateway, for movement in the plane of the gateway, a sliding link connection between each pair of gate elements, a spray device carried by the gateway and adapted to discharge between the gate elements, and means connecting the gate elements and the spray device whereby movement of the gate elements will operate the spray.

2. In an animal spray, a gateway, two pairs of gate elements hinged to the top and bottom, respectively, of the gateway, for movement in the plane of the gateway, a sliding link connection between each pair of gate elements, comprising a member having a sliding connection with one of the gate elements and a hinging connection with the other gate element, a spray device carried by the gateway and adapted to discharge between the gate elements, and means connecting the gate elements and the spray device whereby movement of the gate elements will operate the spray.

3. In an animal spray, a gateway, two pairs of gate elements hinged to the top and bottom, respectively, of the gateway, for movement in the plane of the gateway, a sliding link connection between each pair of gate elements, a spray device carried by the gateway, adapted to discharge between the gate elements, rods hinged to the upper gate elements, and received through openings in the gateway and means attachable to the rods at different positions to act as stops to engage the gateway and to limit movement of the gate elements, and means connecting the gate elements and the spray device whereby movement of the gate elements will operate the spray.

4. In an animal spray, a gateway, a pair of gate elements, hinged to the top and bottom thereof, respectively, a member having a sliding connection with one gate element and a hinged connection with the other gate element, said gate elements being adapted to swing in the plane of the gateway, and a spray device carried by the gateway at the top thereof, and means connecting the gate elements and the spray device whereby movement of the gate elements will operate the spray.

5. In an animal spray, a gateway, a pair of gate elements, hinged to the top and bottom thereof, respectively, and to each other, a pump carried by the gateway at the top thereof and positioned horizontally, said pump including a piston rod, a lever secured to the upper gate member and connected to the piston rod so as to impart reciprocating movement thereto when the gate member swings, and a spray nozzle connected to the pump.

6. In an animal spray, a gateway, a pair of gate elements, hinged to the top and bottom thereof, respectively, and to each other, a pump carried by the gateway at the top thereof and positioned horizontally, said pump including a piston rod, a lever secured to the upper gate member hinged to the gateway for suspending the gate member, extending above said hinge, and connected to the piston rod so as to impart reciprocating movement thereto when the gate member swings, and a spray nozzle connected to the pump.

7. In an animal spray, a gateway, two pairs of gate elements hinged to the top and bottom, respectively, of the gateway for movement in the plane of the gateway, and connected together, a pump cylinder carried by the gateway at the top thereof, a pair of pistons operable in the respective ends of the cylinder, a spray nozzle communicating with the cylinder, operative connections between the gate members and the pistons, such that movement of either gate member away from the other will result in movement of its corresponding piston toward the other piston, and a fluid inlet passage communicating with the pump cylinder between said pistons.

8. In an animal spray, a gateway, a spray device carried thereby at the top and center thereof, two pairs of gate elements, each comprising two elements hinged to the top and bottom, respectively, of the gateway, and connected together, a pair of vertical bars connecting the top and bottom of the gateway in the spaces between the gate elements and the sides of the gateway, a pair of plates secured to the lower gate elements, substantially filling the spaces between the lower gate elements and said bars, and means connecting the gate elements and the spray device whereby movement of the gate elements will operate the spray.

Signed this 23d day of May, 1929, in the county of Woodbury and State of Iowa.

THOMAS E. PECK.